B. BEST,

Assignor, by mesne assignments, to SINCLAIRE RECTIFYING MACHINE CO.

Filter.

No. 9,622. Reissued March 29, 1881.

Attest
Geo. T. Smallwood Jr.
L M Hopkins

Inventor:
Benjamin Best
By Knight Bros Attys

N. PETERS, PHOTO-LITHOGRAPHER, WASHINGTON, D. C.

UNITED STATES PATENT OFFICE.

BENJAMIN BEST, OF CINCINNATI, OHIO, ASSIGNOR, BY MESNE ASSIGNMENTS, TO SINCLAIRE RECTIFYING MACHINE COMPANY, OF NEW YORK, N. Y.

FILTER.

SPECIFICATION forming part of Reissued Letters Patent No. 9,622, dated March 29, 1881.

Original No. 53,395, dated March 27, 1866. Application for reissue filed February 17, 1881.

*To all whom it may concern:*

Be it known that I, BENJAMIN BEST, formerly of Dayton, Montgomery county, and State of Ohio, and now of Cincinnati, Hamilton county, Ohio, have invented a new and Improved Portable Filter; and I do hereby declare that the following is a full, clear, and exact description thereof, reference being had to the accompanying drawings, making a part of this specification, in which—

Figure 3:
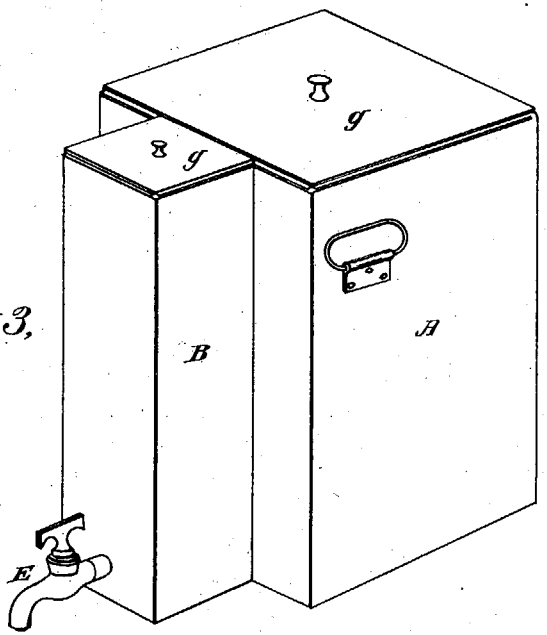
Figure 1:
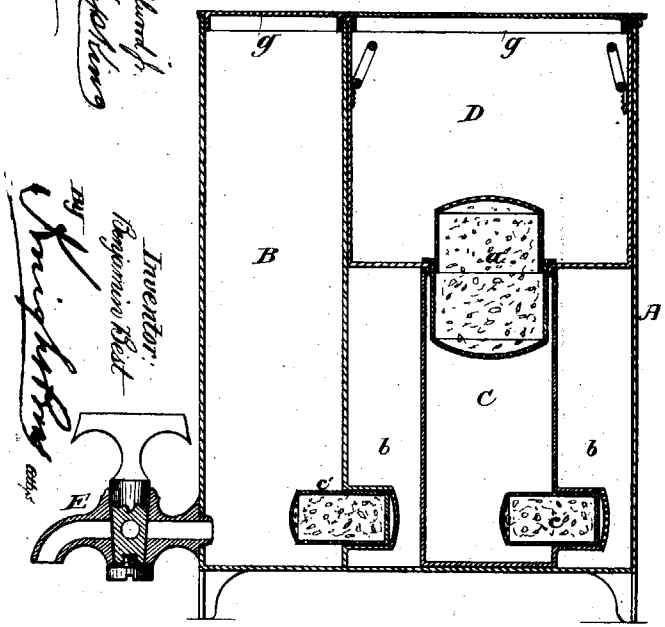
Figure 2:
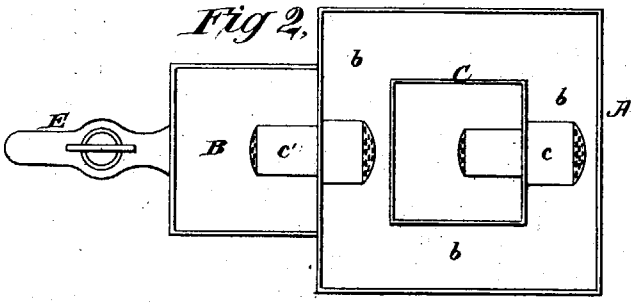

Figure 1 is a longitudinal section taken in a vertical plane through the improved filter. Fig. 2 is a top view of the filter, with the covers and the sand-box D removed. Fig. 3 is a perspective view of the filter complete.

Similar letters of reference indicate corresponding parts in the three figures.

The object of this invention is to obtain a portable filter and water-cooler combined, and to provide such vessel with filtering-tubes, that are arranged in such manner that the water is compelled to pass through such tubes before entering the cooling vessel or chamber. Each tubular filtering-passage is so constructed that it can be conveniently opened and the filtering substance contained in it removed when it becomes foul, so that the apparatus can be kept clean and sweet for any length of time, as will be hereinafter described.

To enable others skilled in the art to understand my invention, I will describe its construction and operation.

In the accompanying drawings, A represents the filtering-vessel, which may be made of any required capacity. B is the cold-water vessel for receiving the filtered water from the vessel A. These two vessels are united together, as shown in the drawings, and they may be made of wood, metal, or other suitable substance.

The filtering-vessel A contains within it a smaller vessel, C, which rests upon the bottom of vessel A, and extends up about half-way of this vessel to a sand-box, D, which latter rests upon the top of said vessel C, and communicates with it by means of a filtering-box, *a*, as will be hereinafter described. The vessel C is of such size in horizontal section that there is a space or chamber *b* around it, which is filled with a suitable filtering substance for filtering the water which escapes from the chamber C before this water enters the cooler B. The vessel C is filled with bone-charcoal or other suitable filtering substance, and it is provided with a small outlet near its bottom, which outlet consists of a tube, *c*, having perforated caps on its ends, as shown in Figs. 1 and 2. The outer perforated cap of said tube is movable, so that it can be taken off and the tube filled with sponge. The communication between the two chambers A B is also made by a sponge-tube, *c'*, which is constructed like the sponge-tube *c*, and arranged near the bottom of said chamber, as shown in Fig. 1.

The sponge-box *a* is constructed and applied to the sand-box D and chamber C, so that its convex perforated ends project above the bottom of the box D, and below the top of the box or chamber C, as shown in Fig. 1. The top portion of the box *a* is removable, for the purpose of affording access to the sponge in this box for cleaning or removing it at pleasure.

The cooling-vessel B is provided with a cock E for drawing off pure water, and this vessel, together with the vessel A, is provided with covers *g g*. The water passes from the sand-box D through the sponge-box *a* into the box C, and through the filtering substance therein to the outlet *c*. This outlet allows the water to escape into the filtering-chamber *b*, from which it finally escapes into the cooler B.

Having thus described my invention, what I claim as new, and desire to secure by Letters Patent, is—

The combination of the sand-box D and filtering-box C, provided with sponge-tubes *a*, *c*, and *c'*, with the vessels A and B, substantially as described.

In testimony that I claim the foregoing I have hereunto set my hand and seal this 13th day of January, A. D. 1881.

BENJAMIN BEST. [L. S.]

Witnesses:

SWAN E. SWANSON,
GEORGE S. MAYO.